(No Model.) 3 Sheets—Sheet 1.
O. DAHL.
ALTERNATING CURRENT MOTOR.
No. 525,447. Patented Sept. 4, 1894.
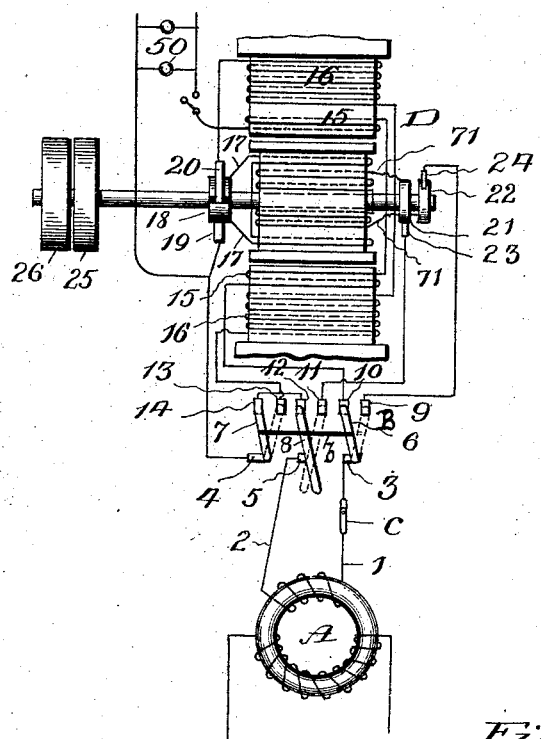
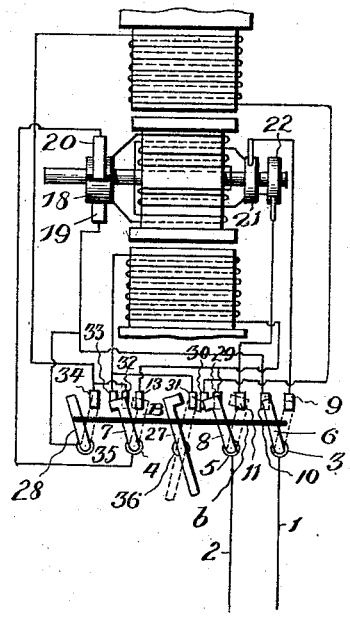
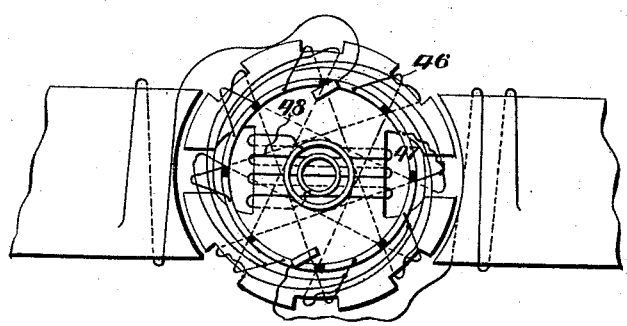
Witnesses
L. C. Hills
Alex. Scott
Inventor:
Olof Dahl,
by Marcellus Bailey
his Atty.

(No Model.) 3 Sheets—Sheet 2.
O. DAHL.
ALTERNATING CURRENT MOTOR.
No. 525,447. Patented Sept. 4, 1894.
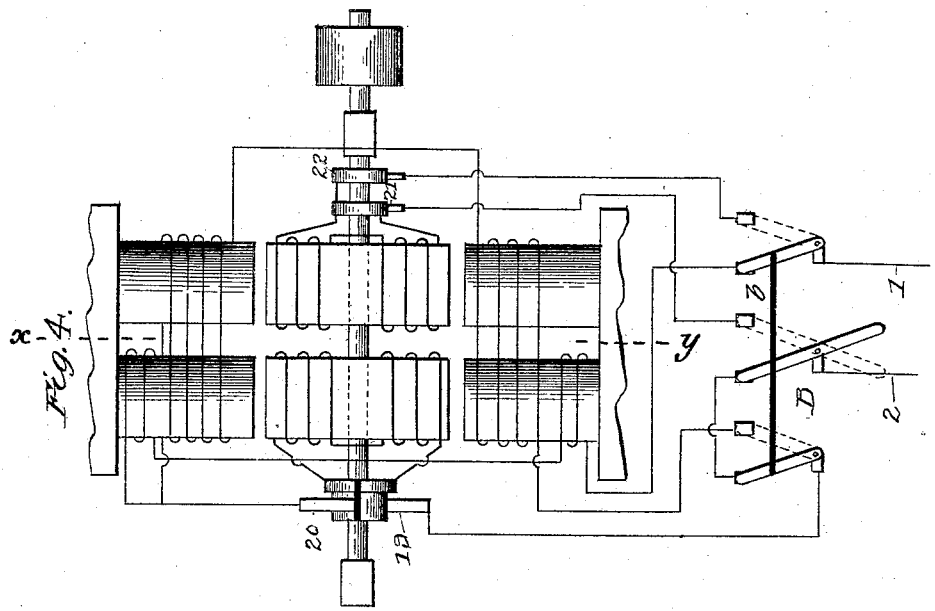
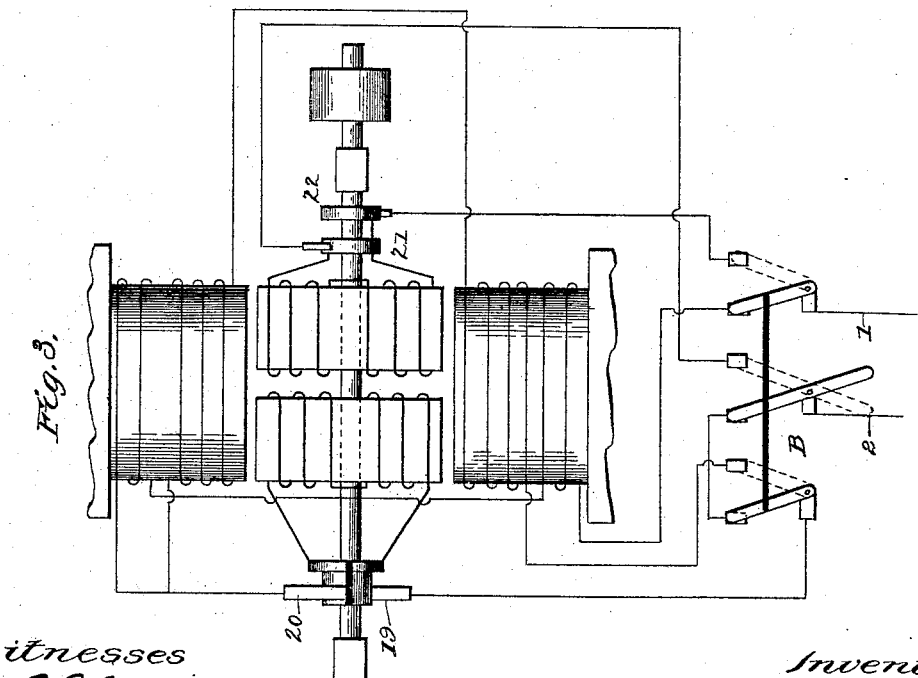
Witnesses
Inventor
Olof Dahl.
G. H. Stockbridge
by Attorney

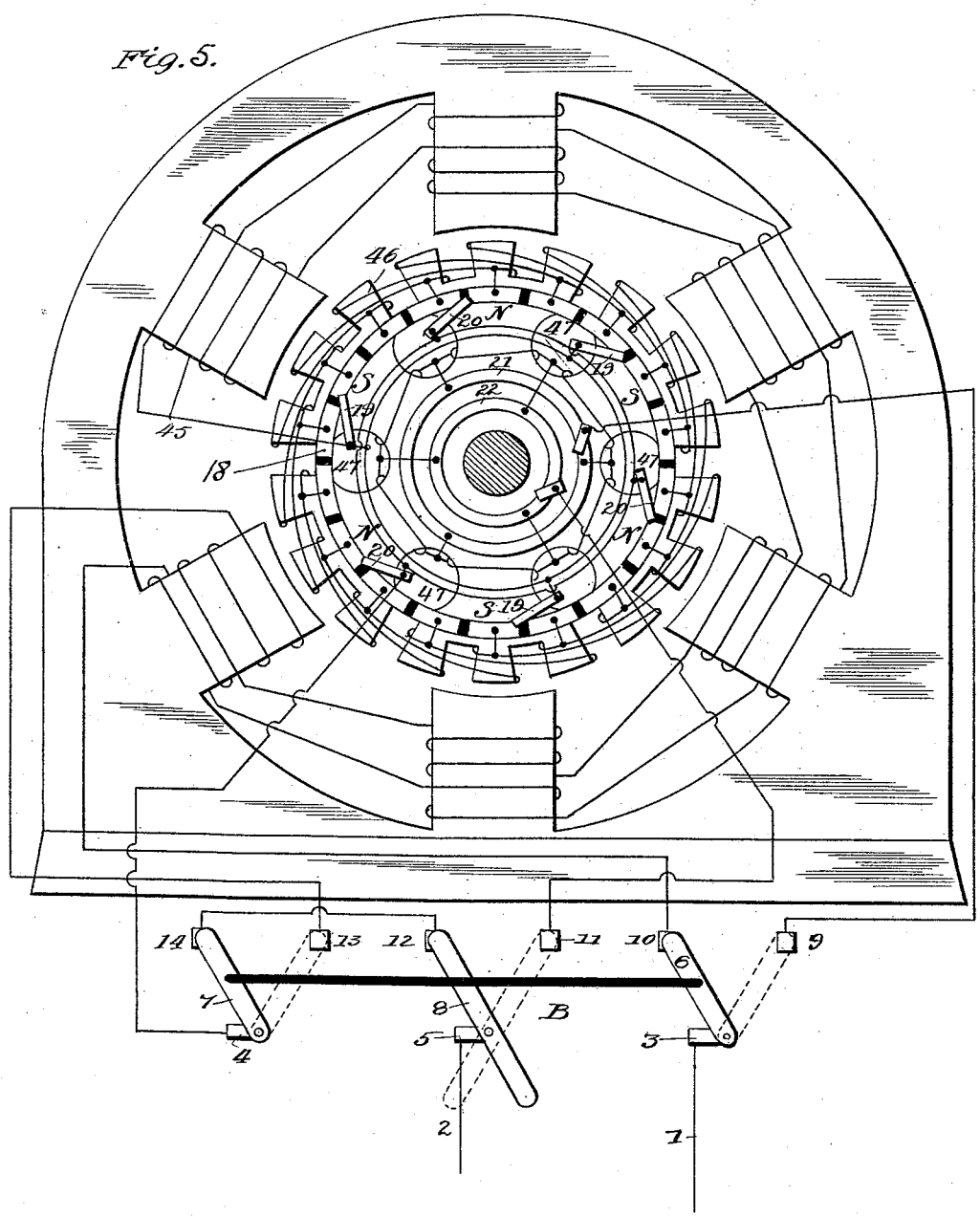

UNITED STATES PATENT OFFICE.

OLOF DAHL, OF PATERSON, NEW JERSEY.

ALTERNATING-CURRENT MOTOR.

SPECIFICATION forming part of Letters Patent No. 525,447, dated September 4, 1894.

Application filed December 8, 1892. Serial No. 454,540. (No model.)

*To all whom it may concern:*

Be it known that I, OLOF DAHL, a subject of the King of Sweden and Norway, residing at Paterson, in the county of Passaic and State of New Jersey, United States of America, have invented certain new and useful Improvements in Alternating-Current Motors; and I do hereby declare the following to be a full, clear, and exact description of the invention, such as will enable others skilled in the art to which it appertains to make and use the same.

The object of my invention is to provide an alternating current electric motor, which can be operated from one of the ordinary alternating currents with the two feeding wires commonly used for electric lighting purposes, and which will be efficient in utilizing the current, as well as in running at a practically constant speed.

It is well known that certain forms of alternating current machines may be connected up in circuit with an ordinary alternating current generator, if they have first been brought to synchronism with the generator, and that they will continue to run in synchronism with the generator as long as current is supplied up to a certain limit of load, when loaded above which limit they will stop running. Such motors are quite efficient, but they labor under the disadvantage that in their use some outside power must be relied upon for starting them, and that they have to be excited with a continuous current. I add to a motor of the class described a commutator, connected to the usual or to an auxiliary winding in the same manner as in ordinary continuous current machines, together with a switch or switches so arranged that by turning the switch or switches to one position the alternating current will be directed through the armature, by means of the said commutator and its brushes, and also through the ordinary field-exciting winding, or an auxiliary field winding, in series, and, secondly, after the motor has torque enough to start and when the armature has reached synchronism, in changing circuits by means of the said switch or switches, so that the alternating current feeding wires will be connected to the collector rings only, and the commutator brushes will be connected, one to each end of the exciting field winding, and a continuous current will be delivered from said commutator, for constantly exciting the field while the motor is running as a synchronous motor. It is obvious that the apparatus here described may be employed as a motor-dynamo, it being necessary to that end simply to take off current from the brushes through a branch supplying electric lights, or other electrical translating devices. It is, of course, desirable that the starting of the motor should be accomplished with as little sparking as possible, and with an even torque. It is also desirable that there should be no dead point to interfere with the successful starting of the apparatus. At the same time, in order to maintain synchronism, it is preferable to employ a type of winding for the armature having well defined poles, resulting from aggregations of wire in compact masses, which arrangement is antagonistic, in a degree, to the objects just mentioned. For reconciling the conflict indicated, I provide, or may provide, two sets of armature windings, independent of each other and differently arranged upon the armature core. The first of these windings I may call a distributed drum winding, the arrangement being such that the starting of the motor is accomplished with an even movement when the starting current traverses the said winding, this result being due to the fact already stated, that the winding is distributed over the face of the armature with substantial regularity and evenness. The second winding is of the shuttle type, and it may properly be called a synchronizing shuttle winding. After the motor has been started and brought to synchronism, the drum winding is cut out of the alternating circuit and the shuttle winding is brought into place. By reason of its well defined poles, this winding tends, in an obvious manner, to maintain synchronism more strongly.

By means of the distributed drum winding above described, dead points are avoided and the starting is smooth and easy. After the switch has been reversed and the commutator brushes have been connected through the exciting field, the same character of winding, that is to say, the distributed drum winding, brings it about that the current used in exciting the field is less fluctuating, whereby hysteresis is avoided.

I have taken the drum and the shuttle winding as types especially adapted to the needs of my apparatus; but other types might be chosen, such for example as the Gramme ring type and they would be equivalent to those above described, provided they accomplished the same results in substantially the same manner.

Besides the advantages for power purposes of a machine constructed according to the principle of my invention, it has other advantages, in that it may be used as a transformer.

Figure 1 is a diagram of a motor and switch apparatus embodying my invention, showing two field windings and two armature windings. Fig. 2 is a diagram of a motor and switch showing one field winding and two armature windings. Fig. 3 is a diagram of a motor and switch, the motor having a single field with two windings, and a double armature, each of which has a single winding. Fig. 4 is a similar diagram of a motor having two fields and two armatures. Fig. 5 is a diagram of a motor having six poles, with double field windings, and two armature windings in accordance with my invention. Fig. 6 shows a similar arrangement of armature windings adapted to be used with a two-pole field.

For the sake of simplicity, the motor is shown, in most of the figures of the drawings, as a bi-polar motor, the armature of which is a so-called Siemens shuttle armature, and the commutator a two-part commutator. An alternating current motor constructed in this way would, with the number of alternations per minute commonly used in the United States of America, run at a speed of seven thousand five hundred revolutions per minute. Such a speed would be generally too high, but by increasing the number of poles, say, to six, as shown in Fig. 6, the motor would have a proportionately smaller number of revolutions, that is, in the case mentioned, two thousand five hundred revolutions per minute. I shall ordinarily, therefore, employ motors having a larger number of poles than two, but I may, where the conditions are favorable, use that number only, and, for the sake of clearness, as already stated, I have illustrated a two-pole motor.

Referring to the drawings by letter, A represents a converter, or other source of alternating currents, connected by wires 1 and 2, to the terminals 3 and 5 of a switch B. At c is shown a special switch, by means of which the alternating current can be cut off from the motor. The switch B has three pivotal terminals, 3, 5 and 4, and six terminals 9, 10, 11, 12, 13, 14, in the range of movement of the switch-bars 6, 8 and 7, which constitute the moving parts of the switch. The switch is moved by means of an operating bar b, of insulating material. The arrangement of the parts is such that while the switch-bars are always in contact with the pivotal terminals 3, 5, and 4, they may rest at the opposite ends, either upon the terminals 10, 12 and 14, respectively, or, when reversed, upon the terminals 9, 11, and 13. The former position is shown in full lines in Fig. 1; the latter, in dotted lines in the same figure.

The motor, shown at D, is provided, in the form illustrated in Fig. 1, with two windings 15 and 16, on its field, and two windings 17, 71, the one distributed, the other concentrated, on its armature. In this figure, as well as in Figs. 2, 3 and 4, which are designed to indicate the different circuit connections and arrangements that may be employed, the two armature windings in question are merely conventional in their representation; but the two types of winding, distributed and concentrated, which throughout are intended and meant are fully illustrated in Figs. 5 and 6, which will hereinafter be more particularly referred to.

On the shaft of the armature is mounted a two-part commutator 18, pressed upon by the usual commutator brushes 19 and 20, while upon the opposite end of the armature shaft are mounted two collector rings 21 and 22, the former being pressed upon by a brush 23, and the latter by a brush 24. The terminals of the armature winding 17 are joined to the two parts of the commutator 18, and the terminals of the concentrated winding 71 are joined on the one side to the collector 21, and on the other to the collector 22. The armature shaft is represented in Fig. 1 as carrying a loose pulley 25 and a tight pulley 26, for transmitting the power developed in the motor. While the use of a loose and a tight pulley is not absolutely essential, yet I prefer to employ this construction, the belt being run on the loose pulley until synchronism is attained, and afterward shifted to the tight pulley.

The full lines at the switch in Fig. 1 represent the position of the parts when it is desired to start the motor. Tracing the circuit from the source A, it goes over the following course:—wire 1, switch c, terminal 3, switch-bar 6, terminal 10, field winding 15, brush 20, commutator 18 and armature winding 17, the other side of the commutator, brush 19, terminal 4, switch-bar 7, terminals 14 and 12, switch-bar 8, and wire 2. Under the conditions described, one of the field windings is in series with the armature, and it is evident that the motor will start up, and run as a series motor. The number of turns in the field winding 15 is so proportioned that the motor will be capable of running, when started, at a speed higher than synchronism. Now, the switch B is kept in the position shown in the full lines until the speed of the motor has risen to, or somewhat above, the point of synchronism, after which the switch is thrown over to its reverse position, shown in dotted lines. The current now passes by way of the wire 1, switch c, terminal 3, switch-bar 6, terminal 9, and brush 24, to the collecting ring 22, whence it goes through the armature winding 71 to the collector 21, and is led off by the brush 23 and its connected wire, to the terminal 11, switch-bar 8, terminal 5, and wire 2. At the same time, a circuit is made from the commutator brush 19, terminal 4, switch-bar 7, terminal 13, through the winding 16 of the field magnet, to the brush 20, thereby causing the output from the armature to traverse the field coils in series, producing alternate north and south poles, with a constant field of force. The motor will then fall into step, and will continue to run synchronously with the generator, and load may be thrown on by means of the loose and fixed pulleys 25 and 26, or by friction clutches or any other preferred means. In this figure is illustrated one example of the availability of the apparatus for use as a transformer. When the switch is in the position shown in dotted lines, the distributed winding 17 stands in the relation of a secondary coil to the concentrated winding 71 which is now in circuit with the generator. The current thus induced in the distributed winding is represented as taken off from the commutator brushes to electric lamps or other translating devices 50 arranged in multiple. A switch s in the translating circuit is provided which is opened when the motor starts or has the switch B in the position shown in full lines, and is closed after synchronism is reached and the concentrated winding is in circuit with the generator; manifestly the switch s can be connected to the main switch B so that both can be thrown simultaneously.

Fig. 2 illustrates a motor, designed to carry out the principle of my invention, and having one field winding in connection with the two armature windings. With this apparatus, the form of the switch is modified by the addition of switch-bars 27 and 28, and terminals 29, 30, 31, 32, 33, 34, 35 and 36. The original course of the current from the generator is by way of wire 1, switch-bar 6, terminal 10, brush 19, commutator 18, on one side, one of the armature windings, opposite side of commutator, brush 20, switch-bar 7, beyond which the current divides, and passes in multiple through the upper and lower field windings, from the terminals 32 and 33, with which the switch-bar 7 is originally in contact, to the terminals 30 and 29, respectively, with both of which the switch-bar 8 is originally in contact, and thence by way of switch-bar 8, terminal 5, and wire 2, back to the source from which it emanates. The alternating current employed in starting this type of apparatus, is divided between the coils of the field magnet, passing through them in multiple, after traversing the armature. The start is made in this way, and after synchronism has been reached, the switch is reversed, with the result that the current from the alternating source passes in at the terminal 3, switch-bar 6 and terminal 9, to the ring 21, through one winding of the armature to the ring 22, and thence back by way of the terminal 11, switch-bar 8, terminal 5 and wire 2. Simultaneously with the reversal of the switch, the external circuit of the armature is completed as follows:—from brush 19 to terminal 35, switch-bar 28, terminal 34, upper magnet coil, terminal 30, switch-bar 27, terminal 31, lower magnet coil, terminal 13, switch-bar 7, terminal 4 and brush 20. The field magnet coils are connected up in series with the brushes, so that there is a constant excitation of the field, with alternate north and south polarization, requiring only synchronism with the exciting source, in order to produce an efficient motor.

In Fig. 3 the arrangement is identical with that shown in Fig. 1, except that in Fig. 3 there are two independent armatures, corresponding to the two windings in Fig. 1.

Fig. 4 is substantially identical with Fig. 1, also, the main difference between the motors illustrated in the two figures being one of structure, and consisting in using two armatures and two field magnets, in place of the doubly wound armature and field magnet of Fig. 1.

In Fig. 5 is shown a machine having six poles, with double field windings and with the two armature windings of different types. The outer winding of the armature (designated by the character 46) is a distributed winding of the drum type, corresponding to the usual winding for the six-pole machine, having a drum armature. The inner winding is of the shuttle type, and is indicated at the cylindrical gaps, or openings 47. In order to make the arrangement of the circuits perfectly clear, I may say that the original circuit is by way of wire 1, terminal 3, switch-bar 6, terminal 10, the outer winding of the field magnets as far as the point 45, thence to the brushes 19 (connected in multiple) through the outer winding of the armature, brushes 20, also connected in multiple, terminal 4, switch-bar 7, terminals 14 and 12, switch-bar 8, terminal 5, and wire 2, said brushes 19 and 20 co-operating with the commutator 18. By reason of the fact that the outer armature winding is spread in the manner illustrated the tendency to rotation is evenly distributed, and the armature begins to rotate with a very even torque. When synchronism has been attained the switch B is reversed, whereupon a new circuit is made as follows:—wire 1, terminal 3, switch-bar 6, terminal 9, ring 21, and the shuttle windings of the armature, ring 22, terminal 11, switch-bar 8, terminal 5, and wire 2. It is obvious that the alternating current traverses the shuttle windings of the armature, which, being aggregated bodies of wire at fixed intervals impart to the motor a strong synchronizing tendency, which is the effect we are seeking to produce. The shuttle windings are such as to make the armature horns or projections which they encircle of alternating opposite polarity.

Simultaneously with the closing of the new circuit through the armature, we have an exciting current passing from brush 19, through the inner coils of the field magnets successively and out to the terminals 13, switch-bar 7, terminal 4, back to the brushes 20. Manifestly, a constant magnetic field with alternating north and south polarity is now excited by the motor current. Consequently, as long as synchronism is maintained the motor will do its work.

Fig. 6 illustrates the two types of armature winding applied to a bi-polar motor. The distributed drum winding is shown at 46, and the synchronizing shuttle winding at 48. The action is identical in principle with that of the six-pole motor shown in Fig. 5.

The rectifying commutator shown in Figs. 1, 2, 3 and 4 is represented as a two-part commutator, and the winding of the armature as an ordinary shuttle winding, mainly for the purpose of avoiding complications in the diagrams. In practice, I should prefer to use other types of winding, and a commutator having many segments connected to such windings, so as to get the advantage of distribution, which has already been referred to in the foregoing specification. It will be observed that Figs. 5 and 6 represent commutators with a larger amount of segments than two, and, in order to secure the best results, I propose to multiply the number beyond the limits indicated in the drawings, on a principle which is well understood in the art of the dynamo electric machinery.

It lies within the scope of the present invention to couple up two machines mechanically and electrically, in such a manner that one shall serve the purpose of starting and exciting, and the other those of synchronous operation. This will be understood by reference to Fig. 4. If it be supposed that the machine there shown is divided on the line $x—y$, then the one part containing the distributed winding will be an exciting and starting machine, and the other part containing the concentrated winding will serve the purpose of synchronizing operation. In this case, one of the machines would be provided with the distributed winding and multiple part commutator, and the other with the concentrated winding and the collector rings. It would not be necessary that the two machines should have the same number of poles, but one machine could be, say, a bi-polar machine, while the other might have six, or any other convenient number of poles.

Having thus described my invention, what I claim as new is—

1. The method of operating synchronous alternating current electric motors, which consists in first passing the alternating current through a distributed area within an active magnetic field, for starting, and subsequently passing said current through a concentrated area, independent of the distributed area, for synchronism, substantially as set forth.

2. In a dynamo electric machine, or alternating current electric motor, an armature having two sets of windings, one being a distributed winding for purposes of starting, and the other a concentrated winding, for purposes of synchronism, as and for the purposes set forth.

3. In a dynamo electric machine or alternating current electric motor, an armature having two sets of windings, one being a concentrated winding for purposes of synchronism, and the other being a winding exterior to the first and distributed evenly over the surface of the armature for purposes of starting, as and for the purpose set forth.

4. In a dynamo electric machine, or electric motor, a field magnet having a winding in the external circuit of the commutator and armature, in combination with the said armature, and collector rings, said armature having independent windings, one of which is distributed, and the other concentrated, substantially as described, a source of alternating current, and a switch, for closing the circuit of the said source, first, through the distributed armature winding, and the field winding in series, and then, by a reversal of the switch, through the concentrated windings, as and for the purpose set forth.

5. In a dynamo electric machine or alternating current electric motor, an armature having two sets of windings, one distributed for starting purposes, the other concentrated for synchronizing purposes, in combination with a field magnet having two sets of windings, one for starting, the other for exciting, collector rings, commutator and brushes therefor, and a switch which in one position puts the starting winding of the field in circuit with the distributed armature winding, and in the other position puts the distributed armature winding in circuit with the exciting field winding, whereby the current induced in the distributed winding is used to excite the field.

In testimony whereof I have signed my name, in the presence of two witnesses, this 2d day of December, A. D. 1892.

OLOF DAHL.

Witnesses:
G. H. STOCKBRIDGE,
H. A. ACKEN.